Jan. 7, 1941.  W. M. B. FITZGERALD  2,227,896
INTERNAL COMBUSTION ENGINE AND THE CHARGING THEREOF
Filed April 12, 1937   7 Sheets-Sheet 1
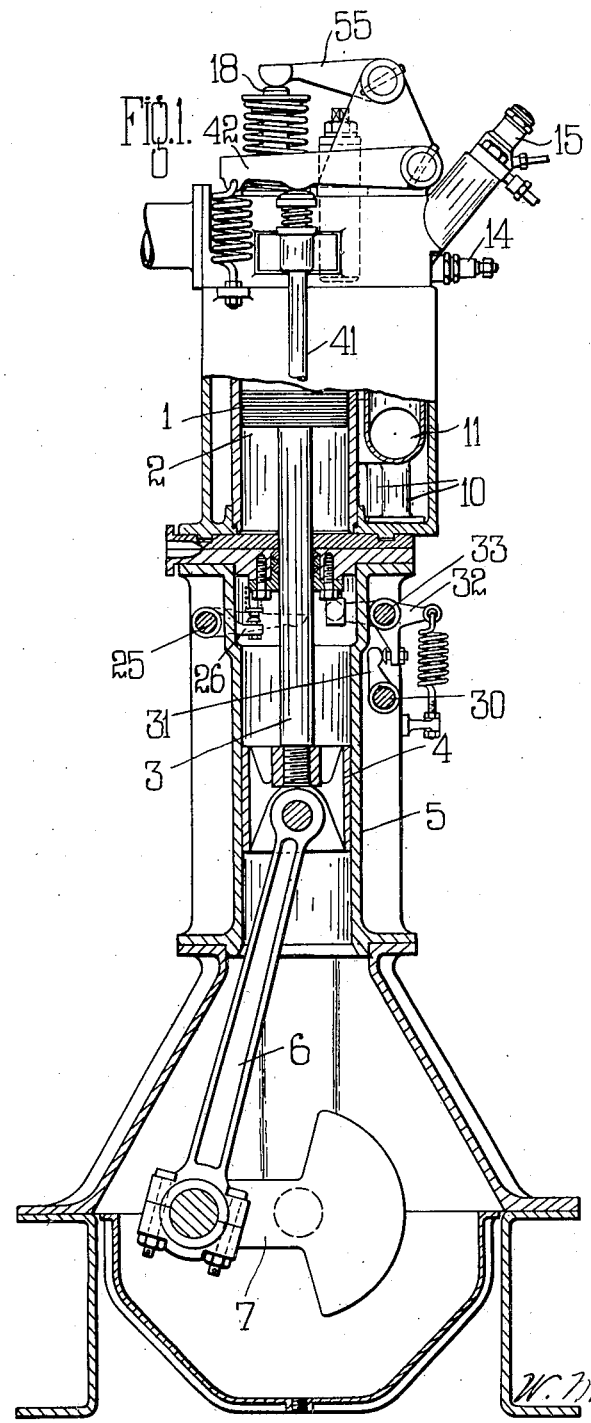

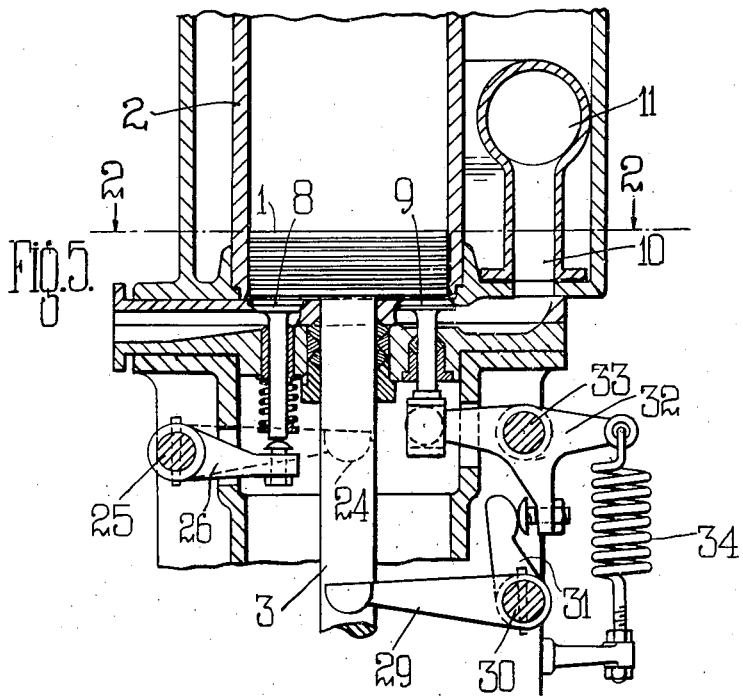
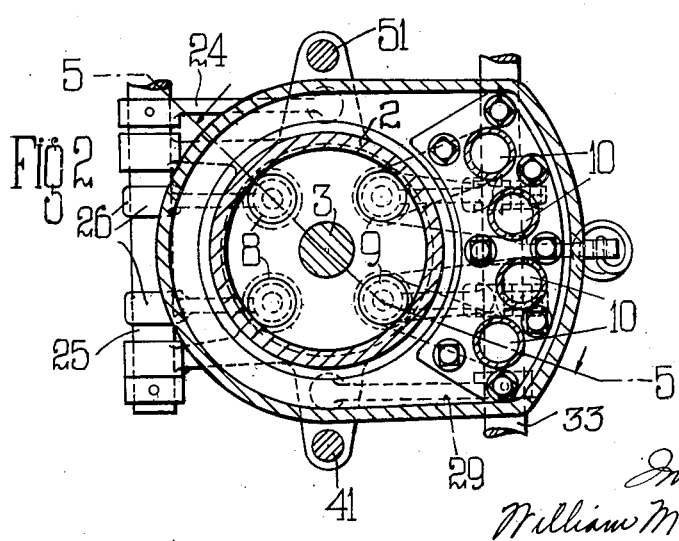

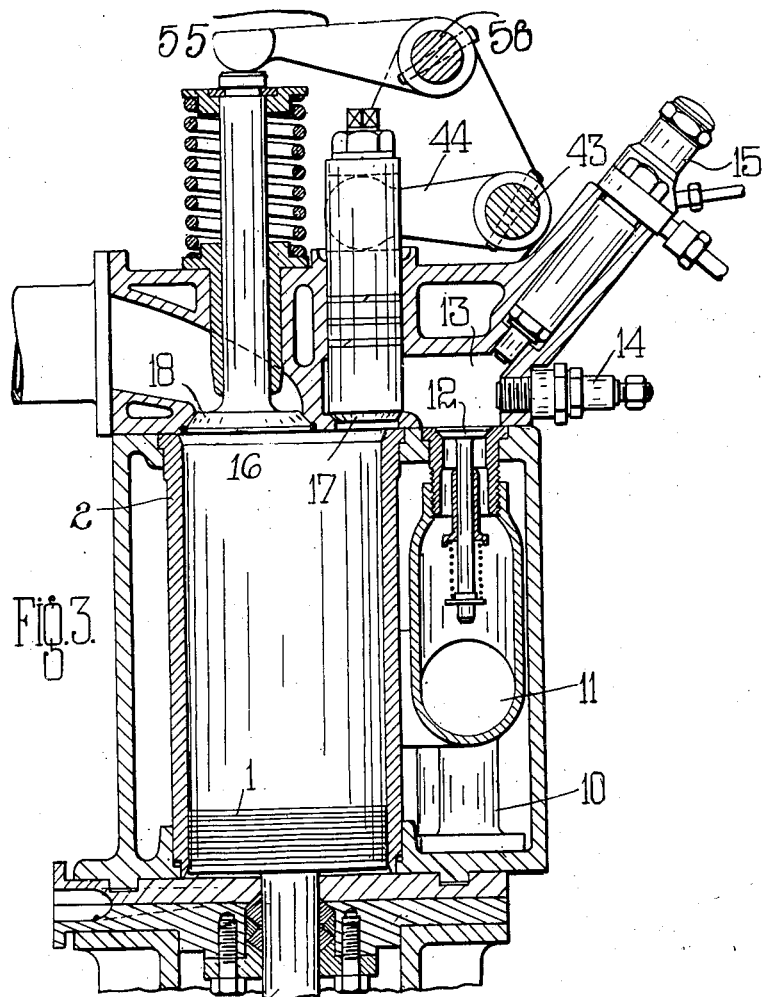
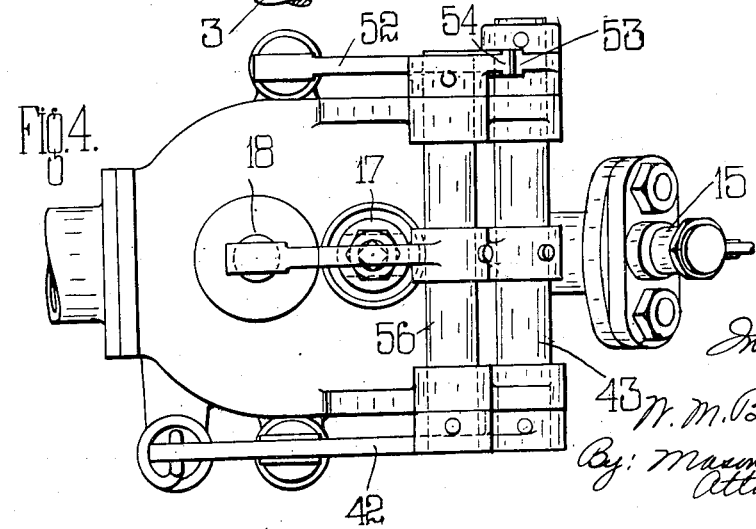

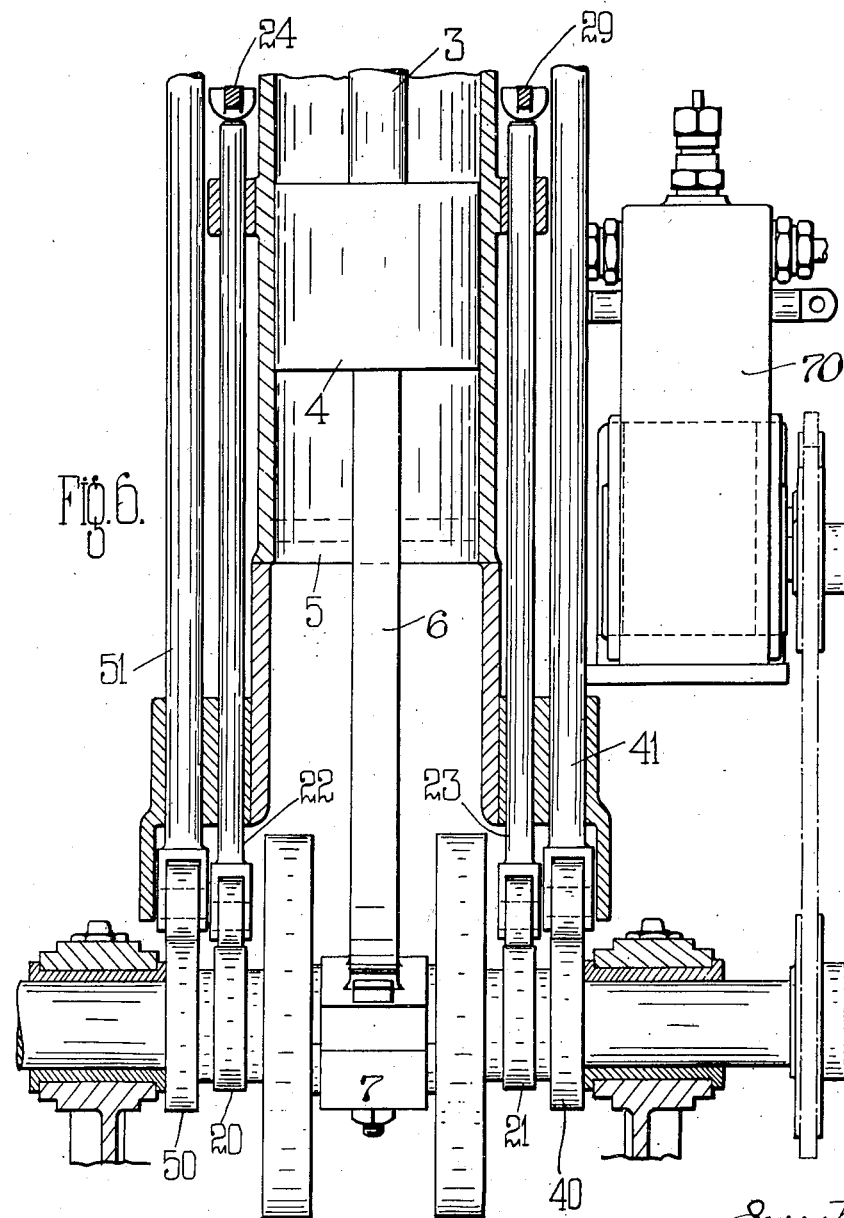

Jan. 7, 1941.　　W. M. B. FITZGERALD　　2,227,896
INTERNAL COMBUSTION ENGINE AND THE CHARGING THEREOF
Filed April 12, 1937　　7 Sheets-Sheet 5
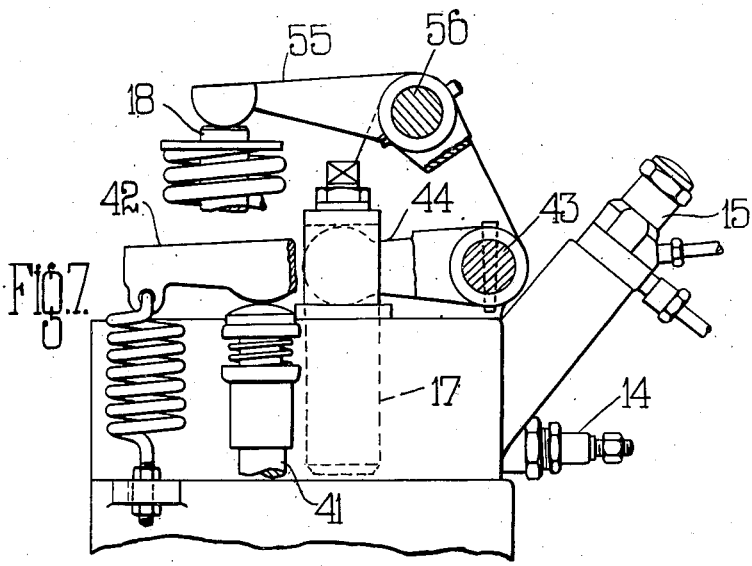
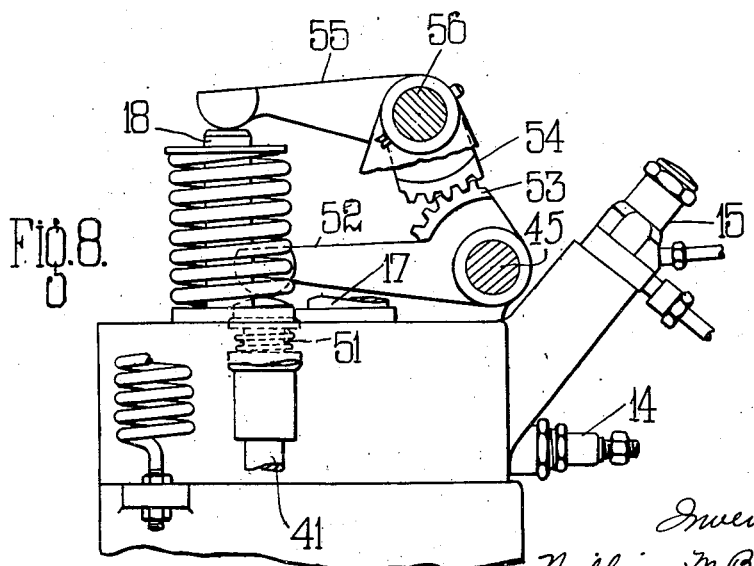
Inventor:
William M. B. Fitzgerald
By Mason & Porter
Attorneys Jan. 7, 1941. W. M. B. FITZGERALD 2,227,896
INTERNAL COMBUSTION ENGINE AND THE CHARGING THEREOF
Filed April 12, 1937 7 Sheets-Sheet 6
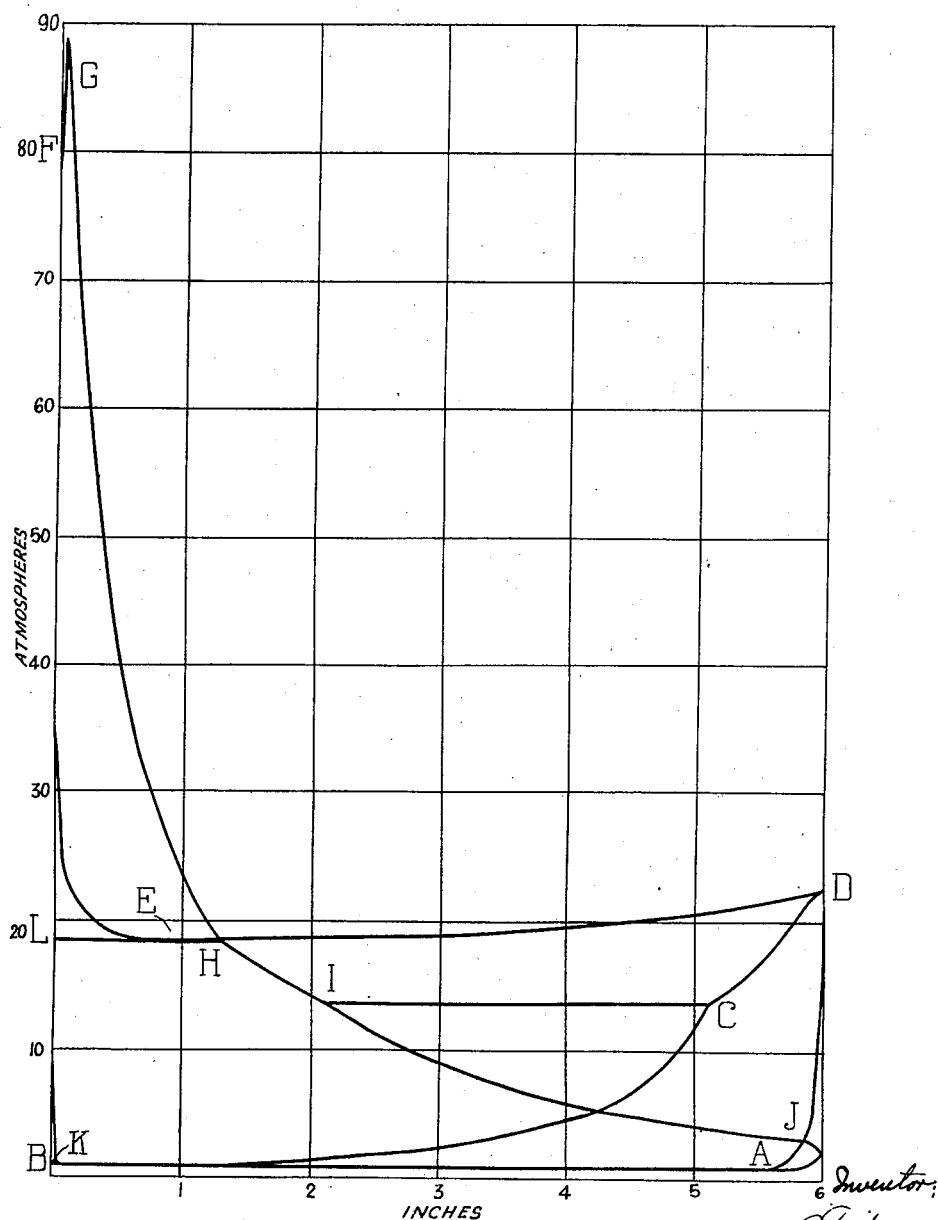

Patented Jan. 7, 1941

2,227,896

UNITED STATES PATENT OFFICE 2,227,896

INTERNAL COMBUSTION ENGINE AND THE CHARGING THEREOF

William Maurice Bard Fitzgerald, Bramhall, England, assignor of one-half to Thomas Ratcliffe, Gatley, England Application April 12, 1937, Serial No. 136,476
In Great Britain April 14, 1936

9 Claims. (Cl. 60—44)

The present invention relates to new and useful improvements in internal combustion engines. Internal combustion engines of this type can employ gasoline, gas or heavy oil as fuel.

According to the present invention, the combustible mixture is preferably formed prior to ignition, and the internal combustion engine is capable of working with a compression ratio of at least 7:1 or with final compression pressures corresponding to compression ratios of 7:1.

One of the features of the invention resides in the cooling of the air or mixture charge during its passage to the ignition chamber so as to permit employment of compression pressures which are considerably higher than those normally found in engines wherein a combustible mixture is formed prior to ignition. Ignition can be commenced in the ignition chamber prior to the end of the exhaust stroke so that a considerable pressure can be built up in the ignition chamber for transmission into the expansion chamber at the end of the exhaust stroke.

A further object of the invention is to provide such an internal combustion engine wherein the combustion chamber can be scavenged after which the ignition chamber is isolated from the expansion chamber so as to enable the ignition chamber and the conveyor passage to be recharged.

The invention is more particularly described with reference to the accompanying drawings in which—

Figure 1 is an elevation partly in section on the line 1—1 of Figure 2.

Figure 2 is a sectional plan view taken on the line 2—2 of Figure 5.

Figure 3 is an enlarged sectional view of a detail of Figure 1.

Figure 4 is a plan view corresponding to Figures 1 and 3.

Figure 5 is a fragmentary sectional elevation on the line 5—5 of Figure 2.

Figure 6 is a fragmentary sectional elevation on an enlarged scale showing the valve operating means.

Figure 7 is a fragmentary elevation showing part of the valve operating means, and Figure 8 is a further fragmentary elevation showing another part of the valve operating means.

Figure 9 is a theoretical indicator diagram illustrating the operation of the engine.

Figure 10:
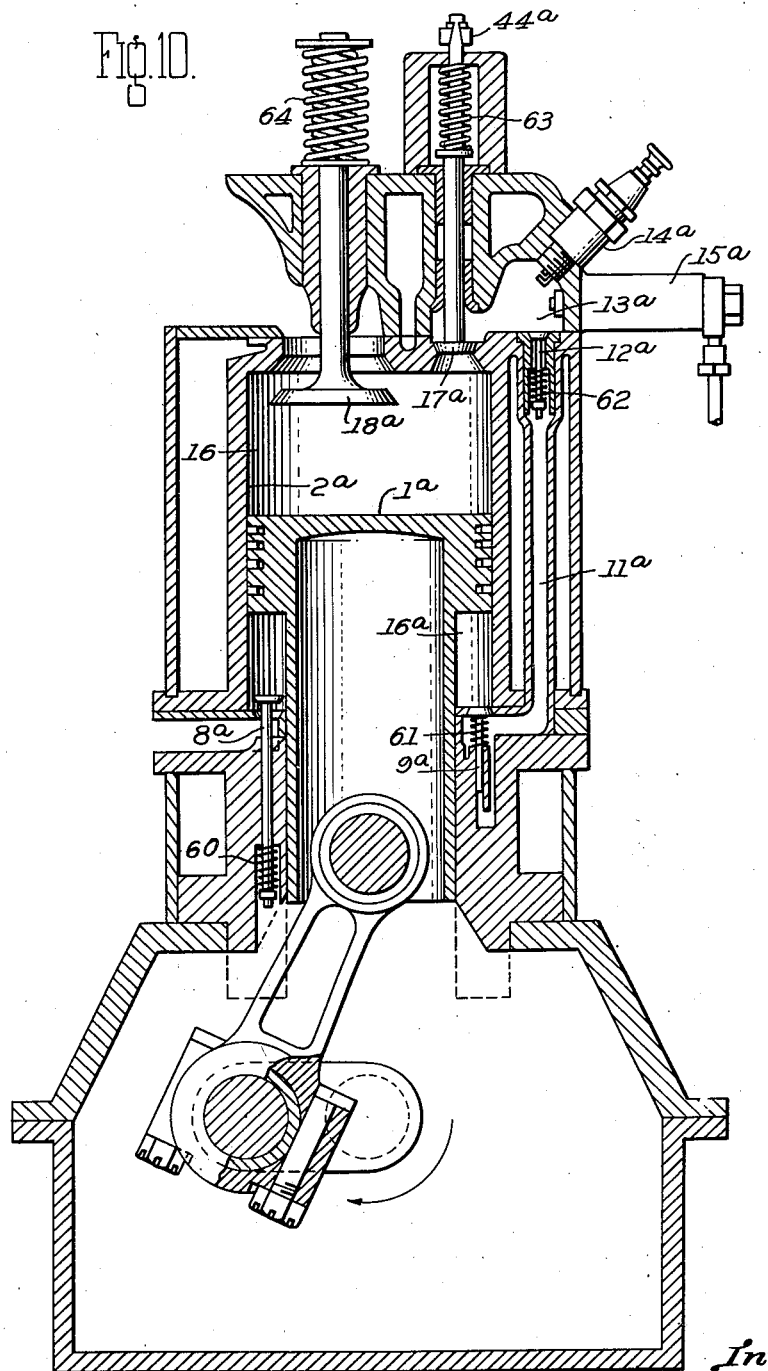
Figure 10 is a sectional view of a modified form of the invention.

A piston 1 working in a water-cooled cylinder 2 is connected by a piston rod 3 to a cross-head 4 working in guides 5, the cross-head being connected by a connecting rod 6 to a crank 7. Expansion and exhaust are carried out above the piston 1 and compression of the air charge is carried out beneath the piston 1.

Referring to Figures 2–5, it will be observed that air is drawn in to the underside of the piston through valves 8 on the upstroke of the piston and on the downstroke is discharged through valves 9 through four cooling passages 10 to a cooling and conveying chamber 11, arranged within the water-jacket of the cylinder. In the particular form of construction shown the passages 10 and chamber 11 constitute a conveyor duct.

From the cooling chamber 11 the air is forced during the downstroke of the piston through an automatically operating spring-loaded valve 12 into an ignition chamber 13. Fuel, preferably gasoline, is fed into the ignition chamber 13 through a connection or nozzle 15 from a suitable fuel pump 70. Ignition of the mixture is effected by a sparking plug 14.

Communication between the ignition chamber 13 and the expansion chamber 16 of the working cylinder is controlled by a mechanically operated valve 17 whilst the exhaust fhom the cylinder 16 is controlled by a mechanically operated valve 18.

It will be appreciated that compression of air into the ignition chamber 13 will finish at the end of the downstroke of the piston 1 and that the air charge will be held or stored in the ignition chamber 13 for a large part of the exhaust stroke of the piston 1. The fuel charge can be injected into the ignition chamber 13 immediately after the end of compression so that there will be adequate time for the fuel thoroughly to mix with the air and mixing will be assisted by virtue of the fact that the air will be relatively warm.

Ignition takes place before the piston 1 reaches the end of its exhaust stroke so that a substantial pressure is built up in the ignition chamber by the time the piston reaches the end of its exhaust stroke. The valve 17 may be timed to open exactly at the end of the exhaust stroke or very slightly before.

It will be observed that whilst this engine is capable of effecting a power stroke per revolution of the engine it nevertheless has the advantage of securing positive exhaust of the products of combustion by virtue of the upward movement of the piston.

The valves 8 and 9 are operated respectively by cams 20, 21 through push rods 22, 23. The push rod 22 actuates a lever 24 which is keyed to a shaft 25 to which are connected a pair of operating arms 26 which extend beneath the stems of the valves 8. The push rod 23 operates a lever 29 keyed to a shaft 30 on which are mounted a pair of levers 31 which abut against corresponding T-shaped levers 32 mounted on a shaft 33. Each T-shaped lever engages in a socket at the end of a valve 9 which is closed by means of a spring 34 connected to another arm of the lever 32.

The valve 17 is operated by a cam 40 operating through push rod 41 to actuate a lever 42 (see Figures 4 and 7) keyed to a shaft 43 on which is fixedly mounted a lever 44 which engages in a suitable socket in the stem of valve 17. The valve 18 is controlled by cam 50 through push rod 51 which operates a lever 52 freely mounted on the end of shaft 45. The lever 52 has a toothed quadrant 53 engaging in a correspondingly toothed quadrant 54 angularly fixed in relation to a lever 55 mounted on a shaft 56 which lever 55 engages at its end with the stem of the valve 18.

The engine shown in the drawings is suitable for working with a compression ratio of about 14:1, that is, the piston swept volume of the pumping piston may be about 14 times the volume of the ignition chamber.

The volume and cross sectional area of the passages 10 and chamber 11 should be sufficient to avoid excessive friction and wire-drawing and in the particular engine of the drawings the total volume of the passages 10 and chamber 11 is about four times the volume of the ignition chamber 13.

Referring to the indicator diagram as shown in Figure 9 the air or air-fuel mixture is induced on the underside of the piston along the line A—B and is compressed along the line B—C. At the point C the valve 9 opens and pressure continues to rise in the compression cylinder, cooling pipes 10, chamber 11 and ignition chamber 13 along the line C—D. At the end of the downward stroke the pressure in the compression chamber falls along the line D—A, whilst during the upward stroke of the piston the pressure in the ignition chamber 13 falls very slightly along the line D—E, ignition taking place at the point E slightly before the end of the upward stroke of the piston. The pressure rises rapidly along the line E—F the valve 17 opening approximately at the point F, whereupon expansion takes place along the line F, G, H. At the point H, the valve 17 being still open, the pressure in the chamber 13 is just becoming less than that in the chambers 10, 11 so that the valve 12 opens and expansion continues in the working cylinder, ignition chamber 13 and chambers 10, 11 along the line H—I the fresh air partially exhausting the products of combustion left in the preignition chamber 13. At the point I the valve 17 closes, whereupon expansion continues in the working cylinder alone along the line I—J. The exhaust valve 18 opens approximately at the point J and as the piston moves up, exhaust proceeds along the line J—K at which latter point the exhaust valve 18 closes.

So far as the pressure cycle in the pipes 10 and chamber 11 is concerned, the pressure falls gradually after the end of compression along the line L—H, during the first part of the downward movement of the piston, whereupon the pressure falls with the expansion in the cylinder along the line H—I. The pressure in chamber 11 is substantially constant along the line I—C, the valve 17 closing at point I and the valve 9 opening at point C, whereupon the pressure rises along the line C—D as compression proceeds during the latter part of the downward movement of the piston. In the engine particularly described and illustrated herein, a suitable timing for the fuel injection would be between the points C and D.

As will have been observed, the present invention enables relatively high compression ratios to be employed and it is believed that compression ratios of 20:1 or 25:1 would be practicable even though a combustible mixture is formed prior to ignition, provided of course that adequate cooling of the charge is carried out before ignition.

Referring to the modified form of the invention as shown in Figure 10, a piston 1a is adapted for reciprocation in a cylinder 2a which is provided with a water jacket. The expansion chamber 16 of the cylinder 2a is located above the piston, and a chamber 16a is provided below the piston by a reduction in the thickness of the piston wall beneath the piston head. On upward movement of the piston 1a, air is drawn into the chamber 16a, past an inlet valve 8a which is automatically open, and closed under the control of a spring 60.

On the down stroke of the piston 1a, the air is compressed in the chamber 16a, and when the pressure reaches a pre-determined value the valve 9a is opened. This latter valve is also under the control of a spring 61 and the pressure in the chamber 16a at which the valve 9a opens will depend upon the pressure in the conveyor duct 11a. When the valve 9a is open, the charge enters the conveyor duct which also serves as a cooling chamber, and passes through the water jacket on its way to an ignition chamber 13a. The duct 11a may, if desired, be provided with other cooling means, as for instance, independent air cooling system. The inlet from the duct 11a to an ignition chamber 13a is controlled by a valve 12a which is preferably automatically operated against the action of a light spring 62.

Fuel may be supplied to the air charge when it is in or entering the ignition chamber 13a. For example, an injector nozzle 15a may open directly into the ignition chamber or be otherwise suitably positioned.

Communication between the ignition chamber 13a and the expansion chamber 16 is controlled by a valve 17a which is closed by a spring 63 and opened by a rocker arm 44a which may be cam-controlled. The exhaust valve 18a is closed by a spring 64 and mechanically opened.

It will thus be appreciated that the ignition chamber 13a will be charged during the downward movement of the piston 1a, and this charging will be completed when the piston 1a begins its upward movement. The charge is held in the ignition chamber during the upward exhaust stroke of the piston, and is preferably fired as the piston approaches the end of its upward stroke. Ignition in this case is caused by sparking plug 14a. Combustion starts in the ignition chamber 13a, but the valve 17a opens approximately at top dead centre and before combustion is complete so that burning proceeds during the early stages of expansion.

I declare that what I claim is:

1. In an internal combustion engine including at least one power cylinder having a piston therein providing an expansion chamber and means for compressing air to support combustion, the provision of a constant volume ignition chamber adapted for communication with the expansion chamber, a first valve controlling such communication, a conveyor duct forming a reservoir in series with said ignition chamber and communicating with the said compressing means, a second valve controlling communication between said conveyor duct and said ignition chamber, a third valve controlling the communication between said conveyor duct and said compressing means, and means for supplying fuel to the air, said compressing means and valves and fuel supplying means being so constructed and timed in relation to one another and to the engine piston that air is compressed up to the full working compression pressure into both the conveyor duct and ignition chamber and the fuel supplied to the air at the earliest when entering the ignition chamber, said second valve being closed at the end of compression when the pressures on either side of it are substantially equal thereby isolating the ignition chamber from the conveyor duct before ignition and the third valve being closed at the end of compression to enable the compressed air in the duct to be stored, the first valve being opened at about top dead centre and remaining open for a limited period during the expansion stroke and the second valve being opened before said first valve is closed and when the pressure in the ignition chamber has, due to expansion, fallen to a value approximately equal to that in the conveyor duct whereby the ignition chamber is scavenged by inflow of high pressure air expanding from the conveyor duct, which scavenging is terminated by closure of said first valve.

2. In an internal combustion engine including at least one power cylinder having a piston therein providing an expansion chamber and adapted to carry out power strokes and exhaust strokes alternately, and means for compressing air to support combustion, the provision of a constant volume ignition chamber adapted for communication with the expansion chamber, a first valve controlling such communication, a cooled conveyor duct forming a reservoir in series with said ignition chamber and communicating with said compressing means, a second valve controlling communication between said conveyor duct and said ignition chamber, a third valve controlling communication between said conveyor duct and said compressing means, and means for supplying fuel to the air, said compressing means and valves and fuel supplying means being so constructed and timed in relation to one another and to the engine piston that the conveyor duct and the ignition chamber are both charged with air up to the full compression pressure during the latter part of the power stroke, the fuel is supplied to the air at the earliest when entering the ignition chamber and the air and fuel stored in the ignition chamber prior to ignition during at least a portion of the exhaust stroke in order to form a good combustible mixture, ignition takes place in the ignition chamber alone before the end of the exhaust stroke and communication is made between the ignition chamber and the expansion cylinder subsequent to ignition and approximately at the end of the exhaust stroke, communication is established between the conveyor duct, ignition chamber and expansion cylinder when the pressure in the ignition chamber, during the power stroke, becomes equal to or less than that stored in the conveyor duct, whereby the ignition chamber is scavenged by high pressure air from the conveyor duct following which the ignition chamber is isolated from the expansion cylinder to discontinue such scavenging and to enable the ignition chamber and conveyor duct to be recharged.

3. In an internal combustion engine including at least one power cylinder having a piston therein providing an expansion chamber on one side and a compression chamber on the other for compressing air to support combustion, the provision of a constant volume ignition chamber adapted for communication with the expansion chamber, a first valve controlling such communication, a conveyor duct forming a reservoir in series with said ignition chamber and communicating with the said compression chamber, a second valve controlling communication between said conveyor duct and said ignition chamber, a third valve controlling the communication between said conveyor duct and said compression chamber and means for supplying fuel to the air, said valves and fuel supplying means being so constructed and timed in relation to one another and to the engine piston that air is compressed up to the full working compression pressure into both the conveyor duct and ignition chamber and the fuel supplied to the air at the earliest when entering the ignition chamber, said second valve being closed at the end of compression when the pressures on either side of it are substantially equal thereby isolating the ignition chamber from the conveyor duct before ignition and the third valve being closed at the end of compression to enable the compressed air in the duct to be stored, the first valve being opened at about top dead centre and remaining open for a limited period during the expansion stroke and the second valve being opened before said first valve is closed and when the pressure in the ignition chamber has, due to expansion, fallen to a value approximately equal to that in the conveyor duct whereby the ignition chamber is scavenged by inflow of high pressure air expanding from the conveyor duct which scavenging is terminated by closure of said first valve.

4. In an internal combustion engine including at least one power cylinder having a piston therein providing an expansion chamber on one side and a compression chamber on the other side and adapted to carry out power strokes and compression strokes simultaneously and power strokes and exhaust strokes alternately, the provision of a constant volume ignition chamber adapted for communication with the expansion chamber, a first valve controlling such communication, a cooled conveyor duct forming a reservoir in series with said ignition chamber and communicating with said compression chamber, a second valve controlling communication between said conveyor duct and said ignition chamber, a third valve controlling communication between said conveyor duct and said compression chamber, and means for supplying fuel to the air, said valves and fuel supplying means being so constructed and timed in relation to one another and to the engine piston that the conveyor duct and the ignition chamber are both charged with air up to the full compression pressure during the latter part of the power stroke, the fuel is supplied to the air at the earliest when entering the ignition chamber and the air and fuel stored in the ignition chamber prior to ignition during at least a portion of the exhaust stroke in order to form a good combustible mixture, ignition takes place in the ignition chamber alone before the end of the exhaust stroke and communication is made between the ignition chamber and the expansion cylinder subsequent to ignition and approximately at the end of the exhaust stroke, communication is established between the conveyor duct, ignition chamber and expansion cylinder when the pressure in the ignition chamber, during the power stroke, becomes equal to or less than that stored in the conveyor duct, whereby the ignition chamber is scavenged by high pressure air from the conveyor duct following which the ignition chamber is isolated from the expansion cylinder to discontinue such scavenging and to enable the ignition chamber and conveyor duct to be recharged.

5. In an internal combustion engine according to claim 1, a sparking plug passing through a wall of the ignition chamber remote from said first valve.

6. A method of operating an internal combustion engine having at least one expansion cylinder and a constant volume ignition chamber fixed relatively to and communicating through a valve with the expansion cylinder and a conveyor duct or reservoir communicating with the ignition chamber and having a valve at its inlet which consists in charging the conveyor duct and ignition chamber with air up to the full compression pressure during the latter part of the power stroke, isolating the ignition chamber from the conveyor duct and closing the inlet end of the conveyor duct at the end of such charging operation, supplying fuel to the air at the earliest when entering the ignition chamber, storing fuel and air in the ignition chamber prior to ignition during at least a portion of the exhaust stroke in order to form a combustible mixture, igniting in the ignition chamber alone before the end of the exhaust stroke, establishing communication between the ignition chamber and the expansion cylinder approximately at the end of the exhaust stroke, establishing communication between the conveyor duct, ignition chamber and expansion cylinder when the pressure in the ignition chamber, during the power stroke becomes equal to or less than that stored in the conveyor duct whereby the ignition chamber is scavenged by compressed air from the conveyor duct, and then isolating the ignition chamber from the expansion cylinder to discontinue such scavenging and to enable the ignition chamber and conveyor duct to be recharged.

7. In an internal combustion engine including at least one power cylinder having a piston therein providing an expansion chamber and adapted to carry out power strokes and exhaust strokes alternately, and means for compressing air to support combustion, the provision of a constant volume ignition chamber adapted for communication with the expansion chamber, an independently and mechanically operated first valve between and common to said ignition chamber and expansion chamber, a conveyor duct forming a reservoir in series with said ignition chamber and adapted to transmit compressed air from said compressing means to said ignition chamber, an independently operated second valve between and common to said conveyor duct and said ignition chamber, an independently operated third valve between and common to said conveyor duct and said compressing means, means for supplying fuel to the air and ignition means in said ignition chamber, said compressing means and valves and fuel supplying means and ignition means being so constructed and timed in relation to one another and to the piston that the said first valve is opened approximately at the top dead centre position of the piston and is closed before the piston reaches the end of its power stroke, fuel is supplied to the ignition chamber after said first valve has closed and ignition is effected in the ignition chamber before said first valve is opened, said second valve is opened during the power stroke when the pressure in the expansion chamber and ignition chamber has fallen approximately to or below that in the conveyor duct, whereby fresh air is allowed to flow into the ignition chamber to displace and scavenge the burnt gases contained therein, which scavenging is thus effected by air alone and during the working stroke only and is terminated by closure of said first valve and whereby also the scavenging is completed prior to the admission of fresh fuel to the ignition chamber.

8. In an internal combustion engine including at least one power cylinder having a piston therein, providing an expansion chamber and adapted to carry out power strokes and exhaust strokes alternately, and means for compressing air to support combustion, the provision of a constant volume ignition chamber adapted for communication with the expansion chamber, an independently operated first valve between and common to said ignition chamber and expansion chamber, means for opening said first valve approximately at the top dead centre position of the piston and for closing it before the piston reaches the end of its power stroke, a conveyor duct forming a reservoir in series with said ignition chamber and adapted to transmit compressed air from said compressing means to said ignition chamber, an independently operated one-way second valve between and common to said conveyor duct and said ignition chamber and an independently operated one-way third valve between and common to a constant conveyor duct and said compressing means, means for supplying fuel to the air at the earliest as the air enters the ignition chamber and timed so that the fuel supply commences after said first valve has closed and ignition means in said ignition chamber timed to ignite the fuel and air mixture therein prior to opening of said first valve, said second valve being adapted to open during the power stroke when the pressure in the expansion chamber and ignition chamber has fallen approximately to or below that in the conveyor duct and while said first valve is open whereby fresh air is allowed to flow from the conveyor duct into the ignition chamber to displace and scavenge the burnt gases therein, which scavenging is thus effected under pressure of air alone and during the power stroke only, and is terminated by closure of said first valve and whereby also the scavenging is completed prior to the supply of fuel to the ignition chamber.

9. In an internal combustion engine including means for compressing air to support combustion, and at least one power cylinder having a piston therein providing an expansion chamber, the provision of a constant volume ignition chamber adapted for communication with the expansion chamber, an independently and mechanically operated first valve between and common to said ignition chamber and expansion chamber, a conveyor duct in series with said ignition chamber and communicating with said compressing means, an independently operated second valve between and common to said conveyor duct and said ignition chamber, an independeutly operated third valve between and common to said conveyor duct and said compressing means, means for supplying fuel to the air and ignition means in said ignition chamber, said compressing means and valves and fuel supplying means and ignition means being so constructed and timed in relation to one another and to the engine piston that air is compressed up to the full working compression pressure into both the conveyor duct and ignition chamber and the fuel supplied to the air at the earliest while the air is entering the ignition chamber and when said first valve is closed, said second valve being closed at the end of compression thereby isolating the ignition chamber from the conveyor duct before ignition and the third valve being closed at the end of compression to enable the compressed air therein to be stored, the charge in the ignition chamber being ignited before said first valve is opened and the first valve being opened at about top dead centre and remaining open for a limited period during the expansion stroke and the second valve being opened before said first valve is closed and when the pressure in the ignition chamber has, due to expansion, fallen to a value approximately equal to or below that in the conveyor dust, whereby the ignition chamber is scavenged during the expansion stroke only by inflow of air alone from the conveyor duct, which scavenging is terminated by closure of said first valve.

WILLIAM MAURICE BARD FITZGERALD.